United States Patent
Firehammer

(10) Patent No.: US 6,577,095 B1
(45) Date of Patent: Jun. 10, 2003

(54) BRUSHLESS ALTERNATING CURRENT ELECTRIC SERVO MOTOR DRIVE

(75) Inventor: Paul W. Firehammer, Livonia, MI (US)

(73) Assignee: Whedco, Inc., Ann Arbor, MI (US)

(*) Notice: Subject to any disclaimer, the term of this patent is extended or adjusted under 35 U.S.C. 154(b) by 0 days.

(21) Appl. No.: 09/594,069

(22) Filed: Jun. 14, 2000

Related U.S. Application Data

(63) Continuation of application No. 09/172,838, filed on Oct. 15, 1998, now abandoned, which is a continuation of application No. 08/645,901, filed on May 14, 1996, now abandoned.

(51) Int. Cl.[7] .................................................. H02P 1/24
(52) U.S. Cl. ...................... 318/727; 318/565; 318/49; 318/50; 318/98; 318/99; 318/105; 318/106; 318/112; 318/560
(58) Field of Search ................................ 318/560, 565, 318/568.2, 49, 50, 68–71, 98, 99, 105, 106, 112; 363/65, 67, 68–72, 74, 82; 307/13, 14, 18–20, 24, 44, 51, 85, 87, 80

(56) References Cited

U.S. PATENT DOCUMENTS

| | | | | |
|---|---|---|---|---|
| 4,371,824 A | * | 2/1983 | Gritter | 318/722 |
| 4,677,535 A | * | 6/1987 | Kawabata et al. | 363/65 |
| 4,779,031 A | * | 10/1988 | Arends et al. | 318/565 |
| 4,780,650 A | * | 10/1988 | Miyazaki et al. | 318/71 |
| 4,918,365 A | * | 4/1990 | Tanuma et al. | 318/685 |
| 5,113,123 A | * | 5/1992 | Noser et al. | 318/34 |
| 5,241,250 A | * | 8/1993 | Nagasawa et al. | 318/591 |
| 5,436,823 A | * | 7/1995 | Araki | 363/71 |

* cited by examiner

Primary Examiner—Karen Masih
(74) Attorney, Agent, or Firm—James M. Deimen

(57) ABSTRACT

AC servo motor drives which allow several AC drives to be connected in parallel and allow for the connection and reconnection of AC servo motors to be accomplished primarily through a central processing unit (CPU). Thus, multiple AC servo motor drives may be ganged under the supervision of the CPU to provide a servo motor with multiple times the current available from a single drive and optionally redundancy in the drives. To provide necessary coordination, the required motor current magnitude and phase (current vector) are broadcast by an axis controller to the drives. This command current vector is broadcast over a high speed serial data bus which allows many simultaneous listeners (the AC servo motor drives). To protect against damage to each drive, each of the three current output terminals is preceded by an output filter. The output filters preceding the terminals permit phase by phase parallel connection of several drives in the service of one servo motor. In the preferred embodiment the drives, CPU, power supply and other major components are modular and plugged into a rack backplane with a double bus structure built therein. The functional modules derive and supply their low voltage power and commands to and from the upper bus structure. However, the new rack backplane configuration includes a high voltage motor drive power bus spaced from the upper bus structure. The new backplane configuration provides a machine controller that eliminates the task of wiring a motor power supply to each AC servo motor drive module.

12 Claims, 3 Drawing Sheets

BRUSHLESS ALTERNATING CURRENT ELECTRIC SERVO MOTOR DRIVE

This application is a continuation of Ser. No. 09/172,838 filed Oct. 15, 1998 now abandoned, which is a continuation of Ser. No. 08/645,901 filed May 14, 1996 now abandoned.

BACKGROUND OF THE INVENTION

The field of the invention pertains to electric servo motor drives and controllers and, in particular, to alternating current (AC) servo motor drives.

In general the speed of an electric motor is proportional to the voltage applied across the motor windings and the torque is proportional to the current flowing through the motor windings. For large motors where current demand is beyond that available from a single drive, the drives must be successfully connected in parallel. Thus, the drives must be designed to each supply a portion of the required current at whatever voltage is necessary to cause the required current to flow.

Methods for paralleling drives for brushed direct current (DC) motors are well known in the industry. Products exist and are available from a number of vendors which allow DC drives to be connected in parallel to drive one brushed DC motor. However, these methods and products control only the magnitude of the current delivered from each of the parallel drives. Such drives are relatively simple because the phase of the voltage and phase of the current (the output current vector) can be ignored.

In order to successfully parallel drives for brushless DC and AC servo motors the phase as well as the magnitude of the resultant output current vector must be accurately controlled. Many of the available AC servo motor drives use a three phase current loop topology. In such a design a separate feedback current loop joins an output current sensor to a summing junction just downstream of the digital to analog converter in each of the three current supplies of a single drive for a servo motor. To gang such drives in parallel requires a further level of sophistication not inherent in DC or AC drives for single servo motors.

SUMMARY OF THE INVENTION

The invention comprises implementation of drive designs for AC servo motors which allow several AC drives to be connected in parallel and allow for the connection and reconnection of AC servo motors to be accomplished primarily through a central processing unit (CPU) that obviates the need for memory units or DIP switches unique to each individual AC servo motor drive. Multiple AC servo motor drives are ganged under the supervision of the CPU.

In order to accomplish the necessary coordination of multiple AC servo motor drives paralleled to a single AC servo motor, the required motor current magnitude and phase (current vector) are broadcast by an axis controller to the drives. Thus, the several drives sharing the one motor load must all have simultaneous access to the command current vector. The command current vector for the drives is broadcast over a high speed serial data bus which allows many simultaneous listeners (AC servo motor drives in modular form and a CPU). To protect against damage to each AC servo motor drive, each of the three current output terminals is preceded by an output filter. The output filters allow the outputs from several drives to be wired in parallel (phase by phase) without the necessity of synchronizing the pulse width modulators (PWMs) among all the drives. Without the filters, large, potentially destructive currents could flow between the connected outputs from the drives.

Thus, each AC servo motor drive module provides power for each of the three phases of a Y-connected motor. (The new AC servo motor drive modules are also applicable to Δ connected motors.) Not only can the drive modules be ganged in parallel for increasing the amperage capacity and thereby the horsepower size of a servo motor, but additional modules can be added in parallel to provide redundancy in the event that an individual module fails. Thus, in sensitive installations the remaining drive modules will continue to fully power the servo motor.

In the preferred installation all of the AC servo motor drive modules, the CPU, the power supply, the input/output module and the axis controller for the command current vector are rack mounted units. The rack format allows all of the various functional modules to be plugged into a rack backplane with a bus structure built therein. The functional modules derive their power and commands from the bus structure. However, the new backplane configuration includes a motor drive power bus and serial data busses between the modules on the rack as opposed to parallel data busses.

Inclusion of the motor drive power bus on the rack backplane provides a machine controller that eliminates the task of wiring a motor power supply to each AC servo motor drive module. Moreover, the serial data busses require significantly fewer wires than parallel data busses. In the preferred embodiment the rack backplane supports six independent busses and minimizes the number of connections to each module and expansion rack. The AC servo motor drive modules can be combined in parallel merely by plugging in jumper wires to the appropriate sockets under the fronts of the modules.

DESCRIPTION OF THE PREFERRED EMBODIMENTS

Figure 1:
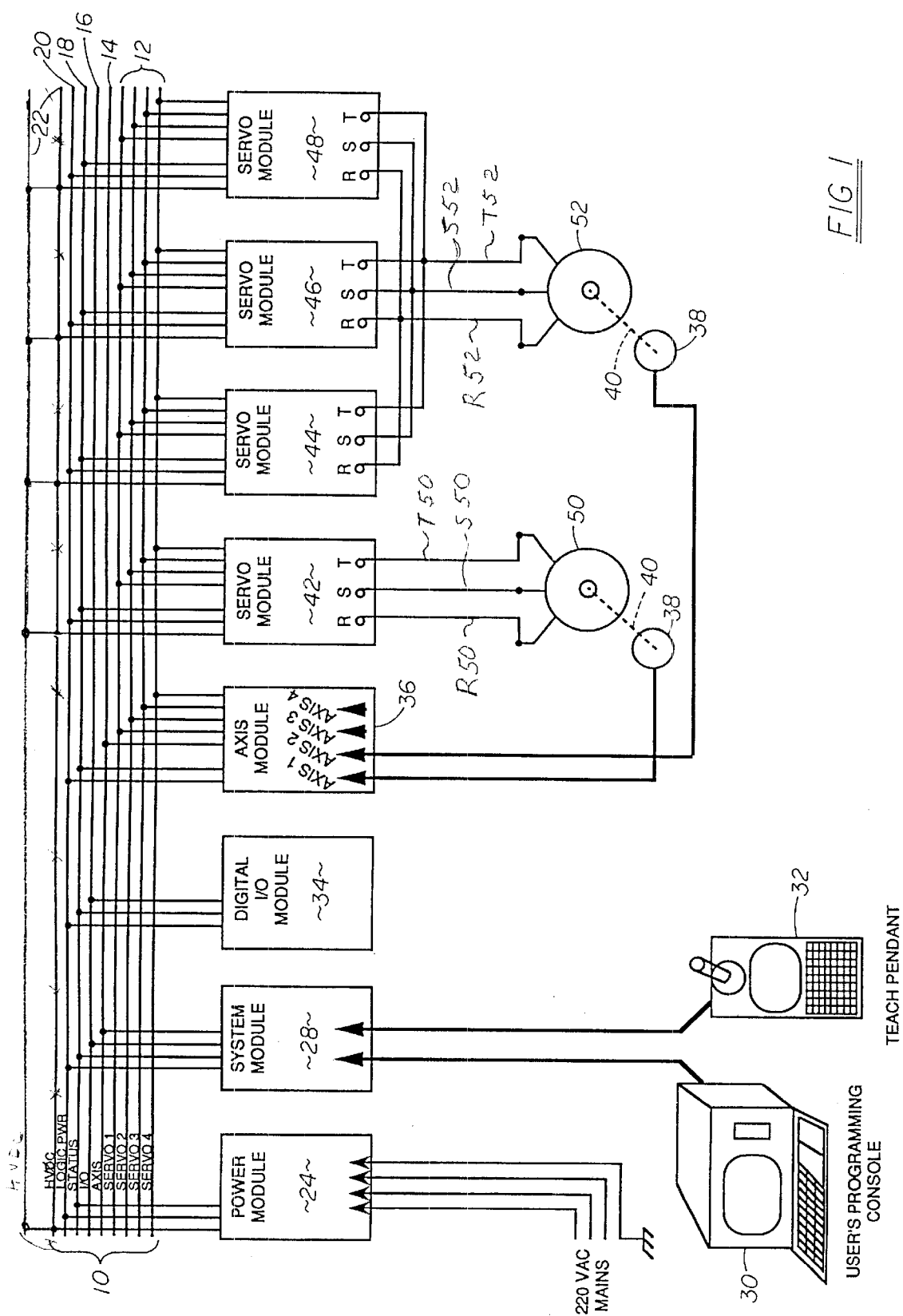
FIG. 1 is a block diagram of the general layout of a machine controller embodying the new AC servo motor drives.

In FIG. 1 the rack backplane generally denoted by 10 is depicted as a plurality of four servo busses 12, an axis communication bus 14, an input/output bus 16, a status bus 18, a logic power bus 20 and a high voltage DC power bus 22. Eight modules are directly connected to the various above busses as appropriate. The power module 24 is a power supply to the high voltage bus 22, the logic power bus 20 and the status bus 18 from the outside 220 VAC mains 26. In the preferred physical embodiment the high voltage DC power bus 22 is spaced below a grouping of the other busses.

The system module 28 provides an interface between the programming console 30 or teach pendant 32 and the axis communication bus 14, input/output bus 16, status bus 18 and logic power bus 20. A direct digital input/output module 34 is directly connected to the input/output bus 16, status bus 18, and logic power bus 20.

The remaining modules directly provide power to the AC servo motors and the external feed back from the motors to the machine controller. The axis module 36 accepts rotational position information from the resolver 38 at each motor shaft 40. An encoder or position transducer may be substituted for the resolver 38. In response to the motor shaft rotational position and the system module 28, the required motor current and phase are broadcast over the servo busses 12 to the AC servo motor drive modules 42, 44, 46 and 48.

For illustration purposes the first servo motor 50 is three phase connected to the R, S and T outlets of servo module 42. The second servo motor 52, however, is three phase gang connected in parallel to the R, S and T outlets of servo modules 44, 46 and 48. Thus, the second servo motor 52 can draw three times the current of servo motor 50. Or, in the alternative, the second servo motor 52 may be rated for twice the current of servo motor 50 with one of the servo modules to servo motor 52 being redundant unless one of the ganged servo modules fails. Absent servo module failure each servo module provides one-third of the required current to servo motor 52.

Figure 2:
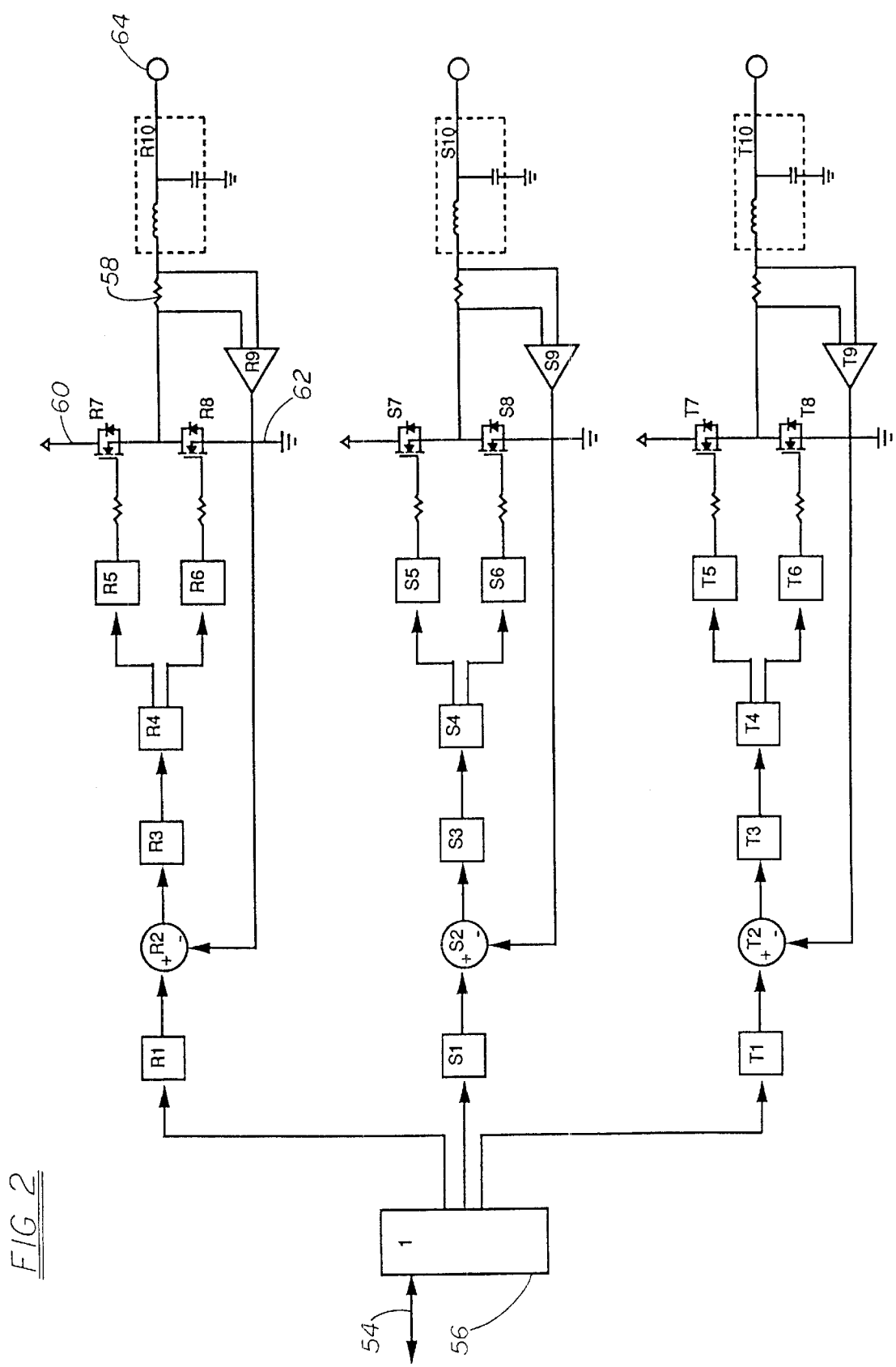
FIG. 2 is a block diagram of a single AC servo motor drive module.

In FIG. 2 an individual AC servo motor drive module is shown. The drive receives a current command on its current vector port 54. The current command information consists of magnitude and phase components. A communication controller and coordinate transform processor 56 (Digital Signal Processor (CPU)) transforms the polar form of the current vector into magnitudes of three vectors spaced 120° apart and writes these magnitudes to the three identical phase circuits generally denoted R, S and T. The three phase circuits R, S and T correspond to the three motor phases. Specifically, the three magnitudes are written to the three digital-to-analog convertors R1, S1 and T1.

The outputs of the three digital-to-analog convertors R1, S1 and T1 are voltage analogs of the current commands for each of the three motor phases and processed by the three identical but separate circuits R, S and T. Thus, the outputs of the three digital-to-analog convertors represent the desired currents. The R circuit is described below with the understanding that the S and T circuits operate in an identical manner.

The actual value of the output current of the R circuit is measured by the current sensor resistor 58 and differential amplifier R9. This value is subtracted at R2 from the output of the digital-to-analog convertor R1. The difference in these two values is the current error. The error is amplified and processed by the compensation circuit R3 and the output of the compensation circuit is fed to the pulse width modulator R4.

The pulse width modulator R4 produces two variable duty cycle, constant frequency, complementary pulse trains. One pulse train is amplified by the upper switch driver R5 and controls the upper output switch R7. The second pulse train is amplified by the lower switch driver R6 and controls the lower output switch R8. When the upper switch R7 is turned on, the input side of the output filter R10 is connected to a source 60 of high voltage DC, typically 200 to 400 volts. Current flows from the high voltage DC supply 60 into the output filter R10. When the lower switch R8 is turned on, the input side of the output filter R10 is connected to the high voltage DC common at 62 and current flows from the filter R10 to the DC common. The filter R10 smooths the current pulses and provides a continuous flow of current to the servo motor through output 64.

The amount of current supplied to the servo motor is a function of the relative duty cycles of the outputs of the pulse width modulator R4. The greater the duty cycle of the upper switch R7, the more current that flows into the servo motor. In addition to providing a smoother flow of current to the servo motor, the output filter R10 very importantly makes possible for servo modules 42, 44, 46 and 48 to be wired in parallel without synchronizing the pulse width modulators R4 among the servo modules.

For example, without a filter, if the upper switch R7 for phase R in one servo module is on at the same time that the lower switch R8 for phase R is on in a second servo module, both modules being wired together in parallel, the DC power will cause a very large current to flow through the two switches R7 and R8 leading to destruction of one of them. The inductors in the output filters R10 limit the rate of change of current flow through the filters, thus preventing current surges that might destroy the switches R7 and R8 in parallel ganged servo modules.

Figure 3:
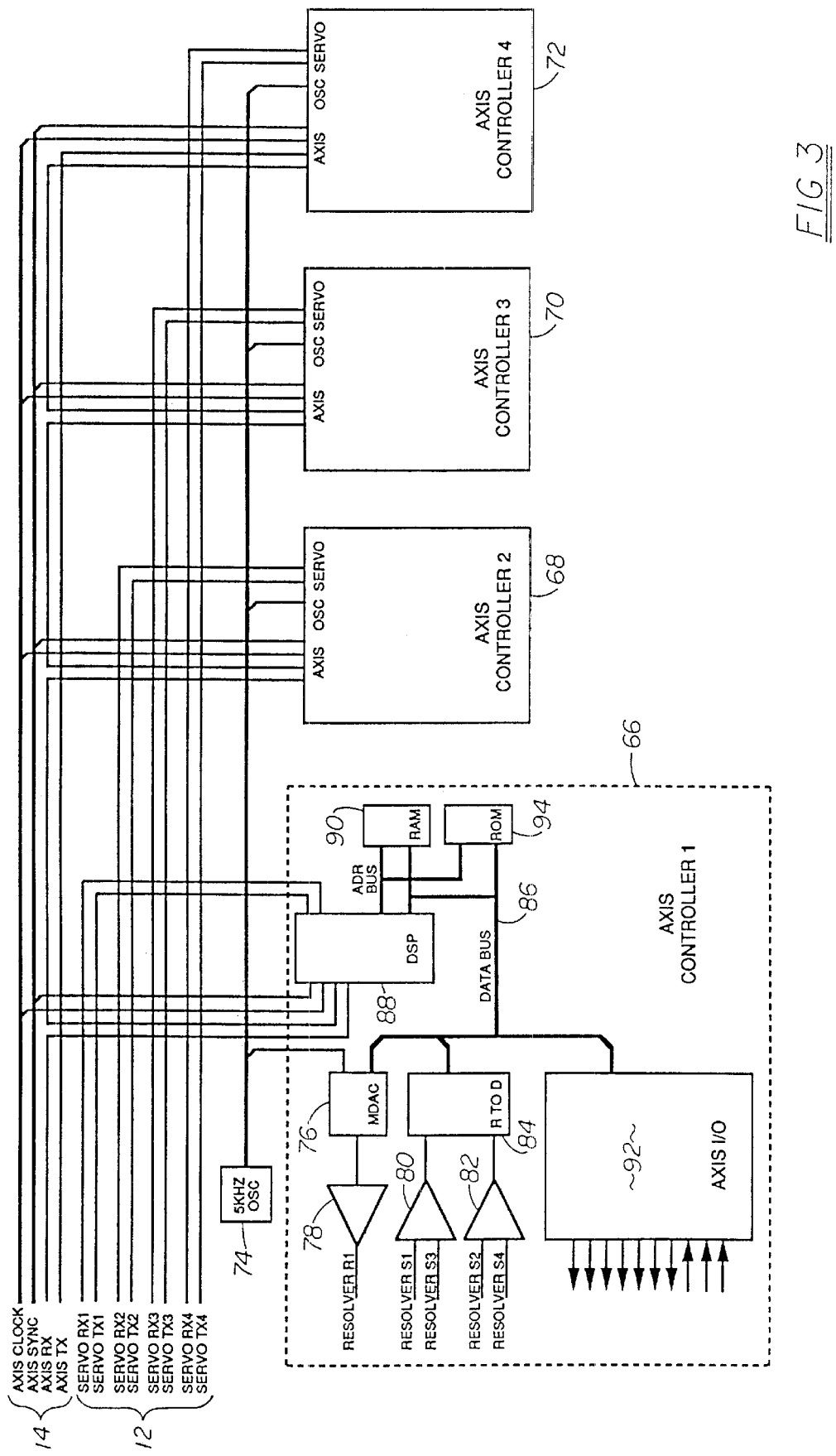
FIG. 3 is a block diagram of the axis module.

The axis module 36 in FIG. 1 comprises two or more axis controllers (in FIG. 1 four corresponding to the number of servo modules 42, 44, 46 and 48 are available). FIG. 3 illustrates the four axis controllers 66, 68, 70 and 72 corresponding to "Axis 1, Axis 2, Axis 3 and Axis 4 shown within axis module 36 of FIG. 1. In FIG. 3 axis controller 66 (Axis 1) is shown in further detail. It may also be noted from FIG. 1 that only one axis controller (Axis 2) is used for motor 52 regardless of the number of ganged servo modules 44, 46 and 48. As shown in the case of FIG. 1 axis controllers 70 and 72 (axis 3 and axis 4) are unused and thus may be deleted from this particular application.

An axis controller such as 66 in FIG. 3 receives information from the system module 28 over the axis communication bus 14. The axis cortroller 66 converts the information to servo motor desired shaft position data. The axis controller compares the actual servo motor shaft position as represented by a signal from the resolver 38 to the desired shaft position data. The difference between the actual shaft position and the desired shaft position is used to compute a command current value (magnitude) and phase angle which in turn is broadcast over a servo communication bus 12 to one or more servo modules.

In detail an axis controller such as 66 operates as follows: A 5 kHz oscillator 74 generates a sinusoidal signal which is scaled by multiplication in the digital to analog converter 76, buffered at 78 and communicated to the resolver 38. This signal electrically excites the resolver rotor which is fastened to the servo motor shaft 40. The four outputs of the resolver 38 are fed to the two buffers 80 and 82 and from there to the resolver to digital convertor 84. The resolver to digital converter 84 converts resolver rotor position to a digital number between 0 and 4095 on the data bus 86.

A digital signal processor 88, operating under a program stored in a random access memory 90, receives the information relating to the desired position of the servo motor shaft from the axis serial communication bus 14. The digital signal processor 88 compares the desired motor shaft position with the actual motor shaft position as read over the data bus 86 from the resolver to digital converter 84, and computes, according to the algorithm stored in the random access memory 90, a new value for the servo motor current magnitude and phase. The digital signal processor 88 broadcasts the new current magnitude and phases over the servo communication bus 12 to one or more servo modules. In the case of the above axis controller 66 the new value is broadcast to servo module 42 and motor 50. Similarly axis controller 68 (axis 2) broadcasts to servo modules 44, 46 and 48 and motor 52.

An input/output module 92 provides additional information concerning the state of the servo motor shaft such as over travel limits and axis home position. As an option the digital signal processor 88 could operate under a program stored in a read only memory 94. However, in the preferred embodiment the read only memory program is only used for start-up until a new program is read from the system module 28 over the axis communication bus 14 and into the random access memory. The digital signal processor 88 then operates under the new program stored in random access memory 90.

As noted above, the method of sensing the magnitude of the current flowing to each of the three motor phases R, S and T is shown as a resistor in series with the current path and a differential amplifier connected across the resistor terminals (58 and R9 in R phase, FIG. 2). For low to moderate values of current, this is the preferred and least expensive design. As currents exceed a few tens of amperes, the resistance of the current sensing resistor must be so small as to make accurate measurements in the above manner difficult. At the high current levels, current sensors employing magnetic components and Hall Effect sensors are the preferred design components.

As noted above with respect to FIG. 2 the output filters R10, S10 and T10 smooth the flow of current to the servo motor and make it possible for the servo modules 42 through 48 to be connected in parallel without synchronizing the pulse width modulators (R4, S4 and T4 in each servo modulator). This is the preferred design, however, by including means to synchronize all of the pulse width modulators of same phase in all of the parallel connected servo modules, the output filters can be eliminated.

Such synchronization can be accomplished by providing a clock signal at the proper frequency on the rack backplane and accessible to all the servo modules 42 through 48. Each pulse width modulator in each servo module is synchronized to this common clock signal such that the upper switches of each phase (R7, S7 or T7) turn on at the same time for all servo modules, for example, one to two microseconds after the low to high clock transition. The upper switches must turn off at or before the high to low clock transition.

Similarly, the lower switches of each phase (R8, S8 or T8) turn on one to two microseconds after the high to low clock transition and must turn off at or before the low to high transition. The one to two microsecond turn on delay is to give the opposite switch time to fully turn off. The rest of the design for each phase in the servo module remains as described previously.

The above alternate synchronizing technique does eliminate the hardware of the output filters, but limits the maximum upper and lower switch duty cycles to approximately 50%. The duty cycle limitation limits the rate of change of current the servo module can control and, therefore, the performance of the servo motor. Thus, this alternative of synchronized pulse width modulators is not the preferred design.

I claim:

1. A modular machine controller comprising a plurality of three phase electric servo motor drive modules, an axis module which accepts servo motor shaft rotational position information and in response to broadcast current command vector information, and means in each servo motor drive module to including a digital signal processor to selectably accept the broadcast current command vector information and in response to convert the selected current command vector information into three separate motor drive currents separated in phase by 120°, means to selectably gang at least two servo motor drive modules in parallel to supply three phase current to a single servo motor, means including said digital signal processor to synchronize corresponding phases of the at least two servo motor drive modules in response to the broadcast current command vector information, and means in each servo motor drive module to prevent destructive current flow between ganged servo motor drive modules by individually filtering each of said three separate motor drive currents whereby the rate of change of current flow in each servo motor drive module is current limited.

2. The modular machine controller of claim 1 including a system module adapted to communicate desired servo motor shaft rotational position information to the axis module, a transducer to communicate actual servo motor shaft rotational position information to the axis module, and means in the axis module to compare the desired servo motor shaft rotational position information to the actual servo motor shaft rotational position information.

3. The modular machine controller of claim 2 including a plurality of axis controllers within the axis module corresponding to each of the plurality of three phase electric servo motor drive modules.

4. The modular machine controller of claim 2 including at least one backplane circuit comprising a plurality of busses, said busses including a high voltage bus, a logic power bus, a status bus, an axis bus and a plurality of servo busses.

5. The modular machine controller of claim 4 wherein the high voltage bus comprises a direct current bus spaced from the other busses.

6. The modular machine controller of claim 1 including means to gang at least one redundant servo motor drive in parallel to supply three phase current to a single servo motor.

7. The modular machine controller of claim 1 wherein the means to gang servo motor drive modules comprises jumper cables connected in parallel phase by phase among the servo motor drive modules.

8. A three phase electric servo motor drive comprising a communication controller having means including a digital signal processor to supply three command currents to each of three phase circuits, said command currents 120° apart in phase, means to selectably gang a second three phase electric servo motor drive in parallel to supply three phase current to a single servo motor, means including said digital processor to synchronize each phase of the second three phase electric servo motor drive with each phase of the first three phase electric servo motor drive in response to external current command vector information, each phase circuit comprising in series a digital to analog converter, a summing junction, a compensation circuit and a pulse width modulator, an upper switch drive and a lower switch drive in parallel, said switch drives controlling an upper switch and a lower switch respectively, and said switch drives in series with said pulse width modulator, a source of current at high voltage connected in series through said switches, a separate output filter connected between the switches to said high voltage current source, said output filter including means adapted to limit the rate of change of current flow through said switches whereby destructive current flow between ganged servo motor drive modules is prevented, and means to sense the current through the output filter and feed back a signal current to the summing junction.

9. The three phase electric servo motor drive of claim 8 including in combination at least one additional three phase electric servo motor drive and an axis controller, said axis controller in communication with the servo motor drives whereby current command information broadcast by the axis controller to the communication controller of each of the servo motor drives causes the corresponding phase circuit command currents of each phase of each of the servo motor drives to be mutually in phase.

10. The three phase electric servo motor drive of claim 9 including a system module in communication with the axis controller whereby desired servo motor shaft rotational position information is sent to the axis controller, means in the axis controller to compare the desired servo motor shaft rotational position information with actual shaft rotational position information and in response adjust the current command information broadcast to the communication controller of each of the servo motor drives.

11. The three phase electric servo motor drive of claim 10 wherein the electric servo motor drives are ganged to supply current for a single motor and a transducer supplies the actual shaft rotational position information to the axis controller.

12. A plurality of three phase electric servo motor drives gangable together to supply current to a single motor, each of the servo motor drives including a digital signal processor in the drive, and, a pulse width modulator and a pair of switches controlled by the pulse width modulator in each of the three phase circuits in each servo motor drive, and clock means to provide a simultaneous synchronizing signal to the pulse width modulator in the corresponding phase circuit of each servo motor drive whereby the currents from the corresponding phase circuits of the selected plurality of servo motor drives are mutually in phase, and a time delay occurs between the alternating closing and opening of each pair of switches whereby destructive current flow between ganged servo motor drive modules is prevented.

\* \* \* \* \*